UNITED STATES PATENT OFFICE

NIKODEM CARO, OF BERLIN-DAHLEM, ALBERT RUDOLPH FRANK, OF BERLIN-HALEN-SEE, AND RUDOLF WENDLANDT AND THOMAS FISCHER, OF PIESTERITZ NEAR WITTENBERG, GERMANY

PROCESS OF REFRIGERATION

No Drawing. Application filed February 7, 1930, Serial No. 426,785, and in Germany February 8, 1929.

This invention refers to a process of refrigeration and relates more particularly to a process for the cooling of nitro compounds and mixtures of nitro compounds with other substances.

Temperatures which are lower than those of the cooling water are often employed during the cooling of nitro compounds, such as nitric acid and nitric oxides of any possible concentration. Such low temperatures are used, for instance, during the treatment of compounds of ammonia combustion products, during the absorption of said compounds by means of water, ammonia or other substances, and during the dissolution, the liquefaction, the freezing-out, or the absorption of various nitric oxides. Similar low temperatures are also employed for the cooling of nitric acid, nitrous acid, nitric acid solutions, nitrates, nitrites and corresponding lyes and derivates.

It is not advisable to employ organic cold carriers for any of the above-mentioned processes, since they may produce explosive mixtures.

Furthermore, the apparatus employed for carrying out these processes consists of aluminum of acid proof steel and cannot be used for aqueous salt solutions. The apparatus may be damaged by chlorides contained in said solutions and by their influence on nitrogen tetroxide, nitric acid, etc., should a leakage occur. The products are liable to become spoiled by such pollutions, and, moreover, nitric oxides having a small percentage require temperatures which cannot be attained by aqueous salt solutions. These obstacles cannot be overcome by employing a solution of double salts with protecting colloids. Said solution is also difficult to produce and to replace. It requires a complicated cleaning, and is quite expensive.

An object of this invention is to obviate the above-mentioned drawbacks and to produce an efficient method for cooling nitro compounds and mixtures thereof with other substances.

This object can be realized by employing aqua ammonia as the cold carrier. Any concentration above 30% may be used for temperatures down to $-75°$ C. so that there is neither the necessity for effecting an accurate adjustment, nor concern about a possible crystallization. Aqua ammonia of 35% or 80% can be used at $-90°$ C. It is even possible to cool to a temperature lower than $-100°$ C. if a concentration of about 34% is sustained. It is possible to cool to higher temperatures by the use of aqua ammonia containing a smaller percentage of ammonia; it follows in this case that the brine is not at all costly. Aqua ammonia having 10% ammonia suffices for $-10°$ C. whereas 20% ammonia is enough for $-30°$ C. Various concentrations of aqua ammonia, ranging from the lowest to the highest concentration can, therefore, be used for different temperatures.

Aqua ammonia is an excellent cold carrier due to its particular physical properties, and it is present in plants producing and employing nitro compounds. Due to this fact the commercial value of the present process is increased. The process may be advantageously employed in plants producing cold by means of evaporating liquid ammonia, for instance in an ammonia-cold engine. The blown-out ammonia may be employed for the ammonia brine after the air has been removed from the engine. Leakages do not affect the usefulness of the brine.

Other substances may be added to the aqua ammonia, and can be dissolved or dispersed therein. Such substances may form complex compounds and improve thereby certain properties of the cold carrier for particular purposes. Such cases are, obviously, within the scope of the present invention, provided that aqua ammonia is employed therein.

We claim:

1. A process of cooling nitro compounds, such as nitric acid and nitric oxides, which consists in bringing said nitro compounds into indirect heat exchange with a mass of cold aqua ammonia, and then cooling said aqua ammonia by bringing it into indirect heat exchange with a primary refrigerant.

2. A process of cooling nitro compounds, such as nitric acid and nitric oxides and mixtures thereof with other substances, which comprises bringing said nitro compounds into indirect heat exchange with a cold mixture containing aqua ammonia, and then cooling said mixture by bringing it into indirect heat exchange with a primary refrigerant.

In testimony whereof we affix our signatures.

NIKODEM CARO.
ALBERT RUDOLPH FRANK.
RUDOLF WENDLANDT.
THOMAS FISCHER.